United States Patent Office 3,111,536
Patented Nov. 19, 1963

3,111,536
ARYLMETHYL ISOTHIOCYANATES
Edward J. Tarlton, Montreal, Quebec, and Arthur F. McKay, Beaconsfield, Quebec, Canada, assignors to Monsanto Canada Limited, La Salle, Quebec, Canada
No Drawing. Filed July 22, 1960, Ser. No. 60,237
5 Claims. (Cl. 260—454)

This invention relates to benzyl isothiocyanates and to the direct production of such products from the reaction of benzyl halides with inorganic thiocyanates.

The isothiocyanates of this invention are useful as industrial preservatives, in slimicides, combatting pests, and the destruction of soil nematodes.

In the prior art, particularly in United States Patent 2,894,013, issued July 7, 1959, numerous methods are already disclosed for the preparation of isothiocyanates. Nearly all these methods require the use of amines as starting material. In many instances it is preferred to produce the desired isothiocyanate by use of organic halides which are frequently more readily available than the corresponding amines. Methods developed in the past for the reaction of organic halides with inorganic thiocyanates lead to the formation of organic thiocyanates. The thiocyanate formed in some procedures have been further treated and converted to the isothiocyanate. Such conversions are by the thermal rearrangement of the organic thiocyanate by distillation, heating in high boiling solvents, etc. These rearrangements depend to a great extent on the nature and degree of substitution on the α-carbon atom.

In the specific procedure outlined by Wheeler, N. L., Amer. Chem. J., 26, 345 (1901), and Dannenburg H. and Rabman, A., Ber., 89, 1625 (1956), diphenylmethyl bromide reacts with potassium thiocyanate in a refluxing ether, acetone or ethanol solution to yield diphenylmethyl thiocyanate. Use of a higher boiling solvent, such as benzene and a prolonged heating period leads to the preparation of diphenylmethyl isothiocyanate. Winthrop, S. O., Sybulski, S., Gavin, G., and Grant, G. A., J. Am. Chem. Soc. 79, 3496 (1957), utilized this procedure in the preparation of 2-chlorodiphenylmethyl isothiocyanate from 2-chlorodiphenylmethyl chloride.

In the prior art only the very active organic halides have given satisfactory yields of isothiocyanates. The reactions of the less active organic halides have been unsuitable in the production of isothiocyanate in that they give low yield, limited activity, require long periods, and entail in most instances a two step procedure.

It is an object of this invention to provide a process for the direct preparation of benzyl isothiocyanates by the reaction of a benzyl halide with an inorganic thiocyanate.

A particular object of the invention is the provision of a simple, one step procedure for the direct preparation of benzyl isothiocyanates in the reaction of a benzyl halide with an inorganic thiocyanate.

Another object of this invention is the preparation of benzyl isothiocyanates in high yield and short time of reaction.

A more specific object of this invention is the production of new and useful benzyl isothiocyanates. Other objects and advantages will become apparent as the description progresses.

The foregoing objectives may be attained in accordance with this invention, the process of which comprises the reaction of a benzyl halide with an inorganic thiocyanate in the presence of a specific solvent at a select temperature. The reaction takes place in a surprisingly short time, that is, in a matter of minutes. The process may be further improved by the addition of a bromide or an iodide ion to the reaction mixture dependent on the benzyl halide reacted. The benzyl isothiocyanate obtained by this invention is the direct product of a reaction in which substantially no thermal isomerization occurs or is necessary as in prior art methods.

The process of this invention results in the production of arylmethyl isothiocyanates such as 3,4-dichlorobenzyl isothiocyanate, 4-chlorobenzyl isothiocyanate, m-nitrobenzyl isothiocyanate, di-(isothiocyanomethyl)-aromatic hydrocarbons such as, 1,4-di-(isothiocyanomethyl)-benzene, 2,4-di-(isothiocyanomethyl)-toluene, 4,4'-di-(isothiocyanomethyl)-diphenylmethane, 4,4'-di-(isothiocyanomethyl)-diphenylether, 4,6-di-(isothiocyanomethyl)-m-xylene, 2,5-di-(isothiocyanomethyl)-p-xylene, di-(isothiocyanomethyl)-durene, di-(isothiocyanomethyl)-mesitylene, 2,4-di-(isothiocyanomethyl)-anisole, 2,4-di-(isothiocyanomethyl)-phenetole, di-(isothiocyanomethyl)-2,3,5,6-tetrachlorobenzene, and tris(isocyanomethyl)-toluene.

The arylmethyl halides useful in the process of the invention are those having at least one hydrogen atom on the halogen substituted carbon atom. Benzyl halides are such as, benzyl chloride, 4-chlorobenzyl chloride, 3,4-dichlorobenzyl chloride, 3-nitrobenzyl chloride, 4-cyanobenzyl chloride, p-xylene dichloride, 2,4-di-(chloromethyl)-toluene, di-(chloromethyl)-mesitylene, di-(chloromethyl)-durene, tris-(chloromethyl)-toluene, 4,4'-(chloromethyl)-diphenylmethane, 4,6-di-(chloromethyl)-m-xylene, 4,4'-di(chloromethyl)-diphenylether, and di-(chloromethyl)-2,3,5,6-tetrachlorobenzene.

Inorganic thiocyanates employed in the reaction are alkali and alkaline earth metal thiocyanates. They include sodium potassium, ammonium thiocyanates and the like.

The reaction of the benzyl halide and inorganic thiocyanate in this invention readily takes place in polar solvents such as inert tertiary amides in which the sole nitrogen atom is bonded only to carbon atoms, and lower dialkyl sulfoxides. Preferred solvents are dimethylformamide, diethylformamide, dimethylacetamide, diethylacetamide and dimethylsulfoxide.

The temperature at which the reaction is carried out is normally at reflux temperature. The temperature can be from about 100° to about 200° C. A preferred temperature is from 130° to 165° C.

Time of reaction is an essence of this invention. Within a matter of minutes the benzyl isothiocyanate is obtained as a direct product of the reaction and in substantial amounts. Depending on varying conditions when carrying out the process the reaction can be complete in about ten minutes. Within five minutes the reaction gives a yield of 30% of isothiocyanate. In ten minutes the yield is increased to over 80–90%. The reaction period should not be in excess of one hour. An increase in the reaction time of this process to about one and one half hours results in a resinous material containing substantially no isothiocyanate. This behaviour coupled with the fact that the thermal isomerization of a benzyl thiocyanate to the corresponding isothiocyanate is a very slow reaction in comparison, excludes the possibility of direct thermal isomerization being of importance.

In carrying out this process a benzyl halide such as 2,4-di-(chloromethyl)-toluene reacts in equivalent amounts with potassium thiocyanate in a refluxing dimethylformamide solution. Formation of the isothiocyanate is very rapid at this temperature. The reaction is complete within ten minutes and is then cooled and the product recovered.

When benzyl chlorides are used in the reaction mixture the presence of an ion, preferably an iodide ion will increase the yield of the isothiocyanate product to 80–90% or more. Results in the use of salts, such as, sodium iodide or tetramethylammonium iodide as a source of iodide ion are given in Table I below.

TABLE I

*Effect of Ions on Reaction of 2,4-Di-(Chloromethyl)-Toluene and Potassium Thiocyanate*

| Salt | Salt/DCMT Molar Ratio | Percent Yield of Diisothiocyanate |
|---|---|---|
| Nil | | 39.0 |
| Tetramethylammonium iodide | 0.01 | 48.8 |
| Do | 0.10 | 71.0 |
| Sodium iodide | 0.10 | 69.6 |
| Do | 0.20 | 76.3 |
| Do | 0.50 | 84.0 |
| Do | 0.75 | 85.4 |
| Do | 1.00 | 80.0 |
| Do | 1.50 | 80.0 |
| Tetramethylammonium Bromide | 0.50 | 72.7 |

The molar ratio of iodide ion with 2,4-di-(chloromethyl)-toluene appears critical. The optimum yield is obtained, as shown in the table above with a molar ratio of 0.75.

The word halide when used in the term benzyl halide in this application means chloride, bromide, or iodide.

The following examples illustrate the invention but are not intended to limit its scope. Parts referred to in this application means parts by weight.

Example I

*1,4-di-(isothiocyanomethyl)-benzene.*—A solution of 0.0125 mole of p-xylene dichloride in 10 ml. of dimethylformamide was added to a stirred refluxing solution (155° C.) of 0.0287 mole of potassium thiocyanate in 25 ml. of dimethylformamide over a period of 3 minutes. The reaction was continued for another 7 minutes and the mixture then cooled. A 2 ml. aliquot portion of the reacted solution was treated with an excess of a standard 0.332 N n-butylamine in dioxane solution. It was allowed to stand for ten minutes and the excess n-butylamine then back-titrated with 0.1 N hydrochloric acid. It was determined by this procedure that a 39.6 percent yield of the diisothiocyanate was obtained.

Example II

*1,4-di-(isothiocyanomethyl)-benzene.*—The procedure of Example I was repeated with the addition to the stirred refluxing solution .0094 mole of sodium iodide (0.75 molar ratio of sodium iodide to organic dihalide). It was determined that an 80.0 percent yield of the diisothiocyanate was obtained.

The product was isolated by dilution with water and extraction with benzene. The product had a melting point to 63.5–64.5° C.

*Analysis.*—Percent calculated for $C_{10}H_8N_2S_2$: C, 54.51; H, 3.66; N, 12.72; S, 29.11. Found: C, 54.41; H, 3.72; N, 12.51; S, 29.27.

Example III

*2,4-di-(isothiocyanomethyl)-toluene.*—A solution of 0.0125 mole of 2,4-di-(chloromethyl)-toluene in 10 ml. of dimethylformamide was added to a stirred refluxing solution (155° C.) of 0.0250 mole of potassiom thiocyanate and 0.094 mole of sodium iodide in 25 ml. of dimethylformamide over a period of 3 minutes. The reaction was continued for another 7 minutes and the mixture then cooled. A 2 ml. aliquot portion of the reacted solution was treated with an excess of a standard 0.332 N n-butylamine in dioxane solution. It was allowed to stand for 10 minutes and the excess n-butylamine then back-titrated with 0.1 N hydrochloric acid. It was determined by this procedure that a 85.4 percent yield of the diisothiocyanate was obtained.

The product was isolated by dilution with water and extraction with benzene. The product had a melting point to 57–58° C.

*Analysis.*—Percent calculated for $C_{11}H_{10}N_2S_2$: C, 56.38; H, 4.30; N, 11.96; S, 27.36. Found: C, 56.63; H, 4.37; N, 12.09; S, 27.20.

Example IV

*Di-(isothiocyanomethyl)-mesitylene.*—A solution of 0.10 mole of di-(chloromethyl)-mesitylene in 100 ml. of dimethylformamide was added to a stirred refluxing solution (155° C.) of 0.22 mole of potassium thiocyanate and 0.075 mole of sodium iodide in 250 ml. of dimethylformamide over a period of 3 minutes.

The reaction was continued for another 7 minutes and the mixture then cooled. A 5 ml. aliquot portion of the reacted solution was treated with an excess of a standard 0.332 N n-butylamine in dioxane solution. It was allowed to stand for 10 minutes and the excess n-butylamine then back-titrated with 0.1 N hydrochloric acid. It was determined by this procedure that an 86.7 percent yield of the diisothiocyanate was obtained.

The product was isolated by dilution with water and extraction with benzene. The product had a melting point to 99.5–100° C.

*Analysis.*—Percent calculated for $C_{13}H_{14}N_2S_2$: C, 59.50; H, 5.37; N, 10.67; S, 24.43. Found: C, 59.45; H, 5.34; N, 10.40; S, 24.67.

Example V

*Di-(isothiocyanomethyl)-durene.*—A solution of 0.0125 mole of di-(chloromethyl)-durene and 0.025 mole of potassium thiocyanate was added to a stirred refluxing solution (155° C.) of 75 ml. of dimethylformamide containing 0.00625 mole of sodium iodide over a period of 2 minutes. The reaction was continued for another 6 minutes and the mixture then cooled. A 5 ml. aliquot portion of the reacted solution was treated with an excess of a standard 0.332 N n-butylamine in dioxane solution. It was allowed to stand for 10 minutes and the excess n-butylamine then back titrated with 0.1 N hydrochloric acid. It was determined by this procedure that an 84.6 percent yield of the diisothiocyanate was obtained.

The product was isolated by dilution with water and extracted with benzene. The product had a melting point to 183–185° C.

*Analysis.*—Percent calculated for $C_{14}H_{16}N_2S_2$: C, 60.83; H, 5.83; N, 10.13; S, 23.19. Found: C, 60.94; H, 5.98; N, 10.42; S, 22.91.

Example VI

*4,4′-di-(isothiocyanomethyl)-diphenylmethane.*—A solution of 0.0125 mole of di-(chloromethyl)-diphenylmethane in 10 ml. of dimethylformamide was added to a stirred refluxing solution (155° C.) of 0.0250 mole of potassium thiocyanate and 0.0094 mole of sodium iodide in 25 ml. of dimethylformamide over a period of 3 minutes. The reaction was continued for another 7 minutes and the mixture then cooled. A 2 ml. aliquot of the reacted solution was treated with an excess of a standard 0.332 N n-butylamine in dioxane solution. It was allowed to stand for ten minutes and the excess n-butylamine then back-titrated with 0.1 N hydrochloric acid. It was determined by this procedure that an 80 percent yield of the diisothiocyanate was obtained.

The product was isolated by dilution with water and extracted with benzene. The product had a melting point to 93.5–95.5° C.

*Analysis.*—Percent calculated for $C_{17}H_{14}N_2S_2$: C, 65.77; H, 4.54; N, 9.02; S, 20.65. Found: C, 65.86; H, 4.59; N, 8.90; S, 21.37.

Example VII

*2,4-di-(isothiocyanomethyl)-toluene.*—The procedure of Example III was repeated with the substitution of ammonium thiocyanate in place of potassium thiocyanate. It was determined by this procedure that a 71.3 percent yield was obtained.

Example VIII

*1,4-di-(isothiocyanomethyl)-benzene.*—The procedure of Example I was repeated with 0.0125 mole of p-xylene dibromide in 20 ml. of dimethylformamide in place of p-xylene dichloride. It was determined by this procedure that a 50.0 percent yield of the diisothiocyanate was obtained.

Example IX

*1,4-di-(isothiocyanomethyl)-benzene.*—The procedure of Example I was repeated with 0.0125 mole of p-xylene diiodide in 40 ml. of dimethylformamide in place of p-xylene dichloride. It was determined by this procedure that an 80 percent yield of the diisothiocyanate was obtained.

Example X

*1,4-di-(isothiocyanomethyl)-benzene.*—The procedure of Example II was repeated but the reaction was carried out at a temperature of 135° C. It was determined by this procedure that a 56.8 percent yield was obtained.

Example XI

*2,4-di-(isothiocyanomethyl)-toluene.*—The procedure of Example III was repeated but the reaction was carried out at a temperature of 165° C. when using dimethylacetamide as the solvent. It was determined by this procedure that a 72.8 percent yield was obtained.

Example XII

*2,4-di-(isothiocyanomethyl)-toluene.*—The procedure of Example III was repeated using dimethylsulfoxide as the solvent. It was determined by this procedure that a 77.3 percent yield was obtained. The process was repeated at a temperature of 194° C. and the yield obtained was 66.6%.

Example XIII

*3,4-dichlorobenzyl isothiocyanate.*—A solution of 0.05 mole of 3,4-dichlorobenzylchloride was added to a stirred refluxing solution (155° C.) of 0.05 mole of potassium thiocyanate and 0.013 mole of sodium iodide in 400 ml. of dimethylformamide over a period of 3 minutes. The reaction was continued for another 7 minutes and the mixture cooled. A 5 ml. aliquot portion of the reacted solution was treated with an excess of a standard 0.332 N n-butylamine in dioxane solution. It was allowed to stand for 10 minutes and the excess n-butylamine then back-titrated with 0.1 N hydrochloric acid. It was determined by this procedure that 66.6 percent yield of the isothiocyanate was obtained.

The product was isolated by dilution with water and extracted with benzene. The product had a boiling point 122–124° C. at .32 mm.

*Analysis.*—Percent calculated for $C_8H_5NS$: C, 44.04; H, 2.31; N, 6.43; S, 14.70. Found: C, 44.11; H, 2.34; N, 6.61; S, 14.50.

Example XIV

*4-chlorobenzyl isothiocyanate.*—A solution of 0.05 mole of 4-chlorobenzylchloride was added to a stirred refluxing solution (155° C.) of 0.055 mole of potassium thiocyanate and 0.001 sodium iodide in 20 ml. of dimethylformamide over a period of 1 minute. The reaction was continued for another 11 minutes and the mixture cooled. A 5 ml. aliquot portion of the reacted solution was treated with an excess of a standard 0.332 N n-butylamine in dioxane solution. It was allowed to stand for 10 minutes and the excess n-butylamine then back-titrated with 0.1 N hydrochloric acid. It was determined by this procedure that a 67.2 percent yield was obtained.

The product was isolated by dilution with water and extracted with benzene. The product had a boiling point 105–108° C. at 0.35 mm.

*Analysis.*—Percent calculated for $C_8H_6NS$: C, 52.32; H, 3.29; N, 7.63; S, 17.46. Found: C, 52.39; H, 3.58; N, 7.97; S, 16.87.

Example XV

*4,6-di-(isothiocyanomethyl)-m-xylene.*—A solution of 0.150 mole of 4,6-di-(chloromethyl)-m-xylene in 150 ml. of dimethylformamide was added to a stirred refluxing solution (155° C.) of 0.345 mole of potassium thiocyanate and 0.1125 mole of sodium iodide in 375 ml. of dimethylformamide over a period of 3 minutes. The reaction was continued for another 6 minutes and the mixture then cooled. By titration, as in Example I, it was determined that an 84 percent yield of the diisothiocyanate was obtained. The product had a melting point to 115.5° C.

Example XVI

*Di-(isothiocyanomethyl) - 2,3,5,6 - tetrachlorobenzene.*—A solution of 0.0050 mole of di-(iodomethyl)-2,3,5,6-tetrachlorobenzene was added to a stirred refluxing solution (155° C.) of 0.0115 mole of potassium thiocyanate in 40 ml. of dimethyl formamide over a period of 2 minutes. The reaction was continued for another 7 minutes and the mixture then cooled. By titration, as in Example I, it was determined that a 93.6 percent yield of the diisothiocyanate was obtained.

Example XVII

*4,4' - di - (isothiocyanomethyl)-diphenylether.*—A solution of 0.010 mole of 4,4'-di-(chloromethyl)-diphenylether in 10 ml. of dimethylformamide was added to a stirred refluxing solution (155° C.) of 0.023 mole of potassium thiocyanate and 0.0075 mole of sodium iodide in 25 ml. of dimethylformamide over a period of 3 minutes. The reaction was continued for another 7 minutes and the mixture then cooled. By titration, as in Example I, it was determined that an 84 percent yield of the diisothiocyanate was obtained.

Example XVIII

*Di-(isothiocyanomethyl) - 2,3,5,6 - tetrachlorobenzene.*—A solution of 0.010 mole of di-(chloromethyl)-2,3,5,6-tetrachlorobenzene, 0.023 mole of potassium thiocyanate, and 0.0075 mole of sodium iodide in 40 ml. of dimethylformamide were refluxed (155° C.) over a period of 10 minutes. The mixture was then cooled. By titration, as in Example I, it was determined that an 82 percent yield of the diisothiocyanate was obtained.

Example XIX

*M-nitrobenzylisothiocyanate.*—A solution of 0.010 mole of m-nitrobenzylchloride in 10 ml. of dimethylformamide was added to a stirred refluxing solution (155° C.) of 0.012 mole of potassium thiocyanate and 0.004 mole of sodium iodide in 20 ml. of dimethylformamide over a period of 3 minutes. The reaction was continued for another 7 minutes and the mixture then cooled. By titration, as in Example I, it was determined that an 82 percent yield of the diisothiocyanate was obtained.

Example XX

*Tris-(isothiocyanomethyl) - toluene.*—A solution of 0.010 mole of tris-(chloromethyl)-toluene in 10 ml. of dimethylformamide was added to a stirred refluxing solution (155° C.) of 0.0360 mole of potassium thiocyanate and 0.0112 mole of sodium iodide in 30 ml. of dimethylformamide over a period of 3 minutes. The reaction was continued for another 7 minutes and the mixture then cooled. By titration, as in Example I, it was determined that a 76 percent yield of the triisothiocyanate was obtained.

While this invention has been described with respect to certain embodiments it is to be understood that it is not so limited in that variations and modifications thereof obvious to those skilled in the art may be made without departing from the spirit or scope of this invention.

We claim:

1. A process for the direct production of an arylmethyl isothiocyanate which comprises reacting an arylmethyl halide having at least one hydrogen atom on the halogen substituted carbon atom and the halide radical being one of the group consisting of chloride, bromide and iodide with an inorganic thiocyanate selected from the group consisting of alkali metal thiocyanate and alkaline earth metal thiocyanate in a solvent selected from the group consisting of lower dialkyl sulfoxide, lower dialkylformamide and lower dialkylacetamide the reaction being carried out for a period of from a few minutes up to about one hour and at a temperature of from about 100° C. to about 200° C.

2. A process as described in claim 1, in which the arylmethyl halide is one of the group consisting of benzyl chloride, 4-chlorobenzyl chloride, 3,4-dichlorobenzyl chloride, 3-nitrobenzyl chloride, 4-cyanobenzyl chloride, p-xylylene dichloride, 2,4-di-(chloromethyl)-toluene, di-(chloromethyl)-mesitylene, di-(chloromethyl)-durene, tris-(chloromethyl)-toluene, 4,4'-(chloromethyl)-diphenylmethane, 4,6-di-(chloromethyl)-m-xylene, 4,4'-di-(chloromethyl)-diphenylether, and di-(chloromethyl)-2,3,5,6-tetrachlorobenzene.

3. A process as described in claim 1, in which the thiocyanate is an alkaline earth metal thiocyanate.

4. A process as described in claim 1, in which the reaction is carried out in the presence of an iodide salt.

5. A process as descibed in claim 1, in which the reaction is carried out in the presence of a bromide salt.

References Cited in the file of this patent
UNITED STATES PATENTS

| | | |
|---|---|---|
| 2,080,770 | Goldschmidt et al. | May 18, 1937 |
| 2,462,433 | Searle | Feb. 22, 1949 |